(No Model.)
G. W. BROWN & J. C. TUNNICLIFF.
CORN PLANTER CHECK ROWER.
No. 278,653. Patented May 29, 1883.
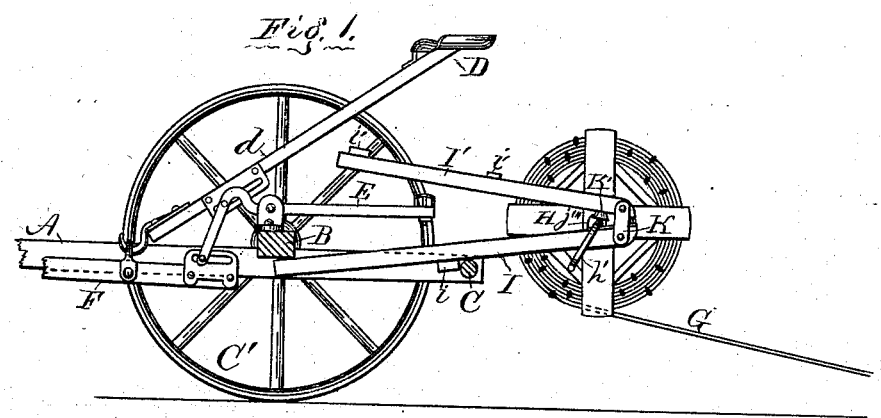
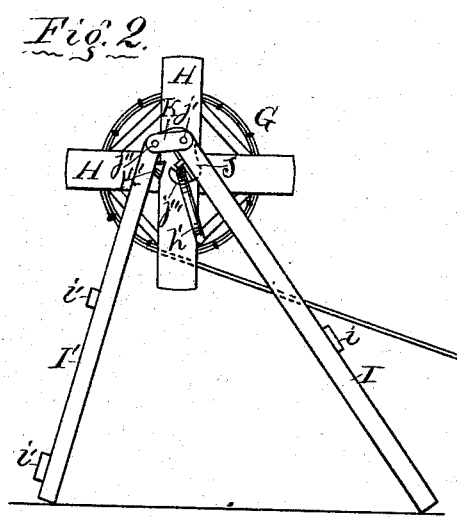
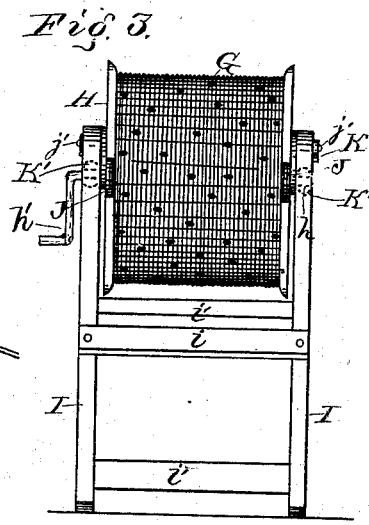
WITNESSES
P. R. Richards
Jas. Wilson
INVENTOR
George W. Brown and
John C. Tunnicliff
By W. B. Richards,
Their Attorney.

UNITED STATES PATENT OFFICE.

GEORGE W. BROWN AND JOHN C. TUNNICLIFF, OF GALESBURG, ILLINOIS.

CORN-PLANTER CHECK-ROWER.

SPECIFICATION forming part of Letters Patent No. 278,653, dated May 29, 1883.

Application filed February 27, 1883. (No model.)

*To all whom it may concern:*

Be it known that we, GEORGE W. BROWN and JOHN C. TUNNICLIFF, citizens of the United States, residing at Galesburg, in the county of Knox and State of Illinois, have invented certain new and useful Improvements in Corn-Planter Check-Rowers; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates generally to corn-planter check-rowers of the class in which a wire or rope stretched across the field is used to actuate the seed-slides; and it relates specially to means used for laying or stretching the wire across the field preliminary to planting, and for spooling or taking the wire up after the planting is completed.

The invention consists in a frame in which the wire-carrying reel is journaled, and which frame is adapted to support the reel while the wire is wound or spooled thereon, and is further adapted for mounting on the rear end of the planter in such manner that while one side of the reel-frame is used to secure it upon the planter and support the reel above the ground the other side of the frame is adapted to act as a brake by means of which the driver with his feet may regulate the tension of the wire in paying it out.

The invention further consists in constructions and combinations hereinafter described.

In the accompanying drawings, which illustrate our invention, Figure 1 is a vertical sectional elevation of the rear frame of a corn-planter, and a side elevation of part of the forward frame thereof, and of our reel and frame, as mounted on said rear frame. Figs. 2 and 3 are elevations of different sides of the reel-frame, showing it fixed for spooling the wire. Fig. 4 is a detail, an elevation of one of the joint-plates.

Referring to the drawings by letters, the same letter indicating the same part in the different figures, A represents one of the side bars; B, the axle, and C the rear transverse bar forming the rear frame of a planter, supported on wheels C'. D is the driver's seat, supported on bar $d$; E, foot-lever hinged to the rear frame and connected with the forward frame, F.

The foregoing parts described by letters constitute parts of an ordinary planter, and may be constructed as shown or in any ordinary manner, and are herein shown and briefly described in order to illustrate the manner of applying our improved reel-frame thereto.

G is an ordinary tappet-wire, and H an ordinary reel, on which the wire is carried when spooled thereon. Our reel-frame is formed of two bars, I I, united by a transverse bar, $i$, near their mid-length portion, and hinged, as hereinafter described, to two other bars, I' I', which are united by transverse bars $i'\ i'$.

Each bar I has a plate, J, fixed to one of its sides and upper end by a ledge, $j$, and bolt, $j'$, and a bar, I', is hinged at one end to the plate J by a bolt, $j''$. The bolts $j'\ j''$ pass through the bars I I', and through a plate, K, on the opposite side of the bars I I from the plate J. The plates J have extended ends formed into hook-shaped bearings $j'''$, which are located at the inner sides of the bars I and form bearings for the extended ends of the reel-shaft $h$, one of which extended ends is formed into a crank, $h'$. The reel may be readily and easily placed in the reel-frame by placing the shaft $h$ in the hook-bearings $j'''$, and screw-bolts $h''$, inserted in the bars I, hold the shaft in said bearings. The reel may be readily and easily removed from the reel-frame by first removing the screw-bolts $h''$. A brake-block, K', is fixed to each bar I' in such position that when the bars I I' are swung toward each other the blocks K' will come in contact with the extended ends of the reel-shaft $h$, as shown at Fig. 1.

When it is desired to lay the wire across the field to be planted, the reel-frame, with the reel and wire, is fixed on the planter by simply placing the ends of the bars I beneath the axle B, and their mid-length parts, resting on the bar C, with the bar $i$ in front of the bar C, will hold and support the reel and wire above the ground in rear of the planter, with the bars I' turned forward, so that their forward ends are accessible to the driver's feet, and with the brake-blocks K' resting on the shaft h. The free end of the wire being first staked or anchored at one side of the field, as the planter is then moved across the field, the wire will be paid off the reel, and the tautness with which the wire is stretched may be regulated by the driver pressing with his feet with greater or lesser force on the bars I', which now act as brake-bars. When the wire is laid as last described, the reel and reel-frame are removed from the planter until the planting is completed, or until it is desired, for any reason, to reel the wire, for which purpose the reel-frame and reel are removed from the planter, and the bars I I', being separated, as shown at Fig. 2, will support the reel, as shown at same figure, at one side of the field, so that the wire may be wound on the reel by turning the reel by means of the crank in the evident manner.

Other means than those we have shown and described may be used for securing the reel-frame on the planter—such as hooks on the forward ends of the bars I, adapted to engage with the planter-axle, or hooks on said bars adapted to engage with the transverse bar C—and hence we do not limit our claims to this manner of securing the reel-frame on the planter, except the claim relating specifically to this feature of our invention.

The bars I', when mounted on the planter, are sufficiently elevated not to interfere with the foot-lever E in planters of that class in which such foot-lever is used.

Having thus described our invention, what we claim as new, and desire to secure by Letters Patent, is—

1. In combination with the reel and reel-carrying bars I, adapted to be secured to the rear part of the planter, substantially as described, the bars I', hinged to the bars I, and adapted to act as brake-bars, convenient to the driver's feet, when the reel-frame is mounted on the planter for laying the check-row wire, and to act as supports for the reel when the reel-frame is removed from the planter for winding the wire on the reel, substantially as and for the purpose specified.

2. In combination, the bars I' and bars I, hinged to each other, the bars I having the reel journaled thereto, and adapted to be secured to the planter by passing beneath the axle B and resting on the bar C, with the cross-bar i in front thereof, substantially as and for the purpose specified.

3. In combination with the check-row wire, the reel, and the bars I, adapted to be secured to the planter, substantially as described, the bars I', provided with brake-blocks adapted to act on the reel-shaft, substantially as and for the purpose specified.

4. In combination with the check-row wire and reel, the bars I I', hinged to each other by plates J and K and bolt $j''$, the plate J having hook-bearing $j'''$ for the reel-shaft h, substantially as and for the purpose specified.

5. In combination with the check-row wire and reel, the bars I I', hinged to each other by plates J K and bolt $j''$, the plate J having a hook-shaped bearing for the reel-shaft, and the bars I' having brake-blocks adapted to act on the said shaft, substantially as and for the purpose specified.

6. In combination with the axle B and bar C of a corn-planter, the bars I, to one end of which the wire-carrying reel is journaled, and the other ends of which are placed over the bar C and under the axle B, for the purpose of sustaining the reel above the ground, substantially as and for the purpose specified.

7. In combination with the check-row wire, reel carrying the same, and the corn-planter, a frame which is secured to the planter, carries the reel, and has a frame hinged thereto, adapted to act as a brake on the reel, and which is accessible to the driver's feet while sitting on his seat on the planter, substantially as and for the purpose specified.

In testimony whereof we affix our signatures in presence of two witnesses.

GEORGE W. BROWN.
JOHN C. TUNNICLIFF.

Witnesses:
M. J. DOUGHERTY,
I. S. PERKINS.